Sept. 29, 1953  H. PARTINGTON  2,653,440
MEANS FOR DOFFING RING FRAMES
Filed Jan. 10, 1950  17 Sheets-Sheet 1

INVENTOR
HAROLD PARTINGTON
BY Francis E. Boyer
ATTORNEY

Sept. 29, 1953     H. PARTINGTON     2,653,440
MEANS FOR DOFFING RING FRAMES
Filed Jan. 10, 1950     17 Sheets-Sheet 2

INVENTOR
HAROLD PARTINGTON
BY: Francis L. Boyce
ATTORNEY

Sept. 29, 1953 H. PARTINGTON 2,653,440
MEANS FOR DOFFING RING FRAMES
Filed Jan. 10, 1950 17 Sheets-Sheet 3

Sept. 29, 1953      H. PARTINGTON      2,653,440
MEANS FOR DOFFING RING FRAMES
Filed Jan. 10, 1950      17 Sheets-Sheet 5

INVENTOR
HAROLD PARTINGTON
BY Francis E. Boyce
ATTORNEY

Sept. 29, 1953     H. PARTINGTON     2,653,440
MEANS FOR DOFFING RING FRAMES
Filed Jan. 10, 1950     17 Sheets-Sheet 7

INVENTOR
HAROLD PARTINGTON
BY: Francis E. Boyes
ATTORNEY

Sept. 29, 1953     H. PARTINGTON     2,653,440
MEANS FOR DOFFING RING FRAMES
Filed Jan. 10, 1950     17 Sheets-Sheet 8

INVENTOR
HAROLD PARTINGTON
BY Francis E. Boyer
ATTORNEY

Sept. 29, 1953     H. PARTINGTON     2,653,440
MEANS FOR DOFFING RING FRAMES
Filed Jan. 10, 1950                            17 Sheets-Sheet 9

INVENTOR
HAROLD PARTINGTON
BY Francis E. Boyce
ATTORNEY

Sept. 29, 1953   H. PARTINGTON   2,653,440
MEANS FOR DOFFING RING FRAMES
Filed Jan. 10, 1950   17 Sheets-Sheet 10

INVENTOR
HAROLD PARTINGTON
BY: Francis E. Boyce
ATTORNEY

Sept. 29, 1953     H. PARTINGTON     2,653,440
MEANS FOR DOFFING RING FRAMES
Filed Jan. 10, 1950     17 Sheets-Sheet 11

INVENTOR
HAROLD PARTINGTON
BY: Francis D. Boyce
ATTORNEY

Sept. 29, 1953     H. PARTINGTON     2,653,440
MEANS FOR DOFFING RING FRAMES
Filed Jan. 10, 1950                        17 Sheets-Sheet 12

INVENTOR
HAROLD PARTINGTON
BY: Francis C. Boyce
ATTORNEY

Sept. 29, 1953  H. PARTINGTON  2,653,440
MEANS FOR DOFFING RING FRAMES
Filed Jan. 10, 1950  17 Sheets-Sheet 13
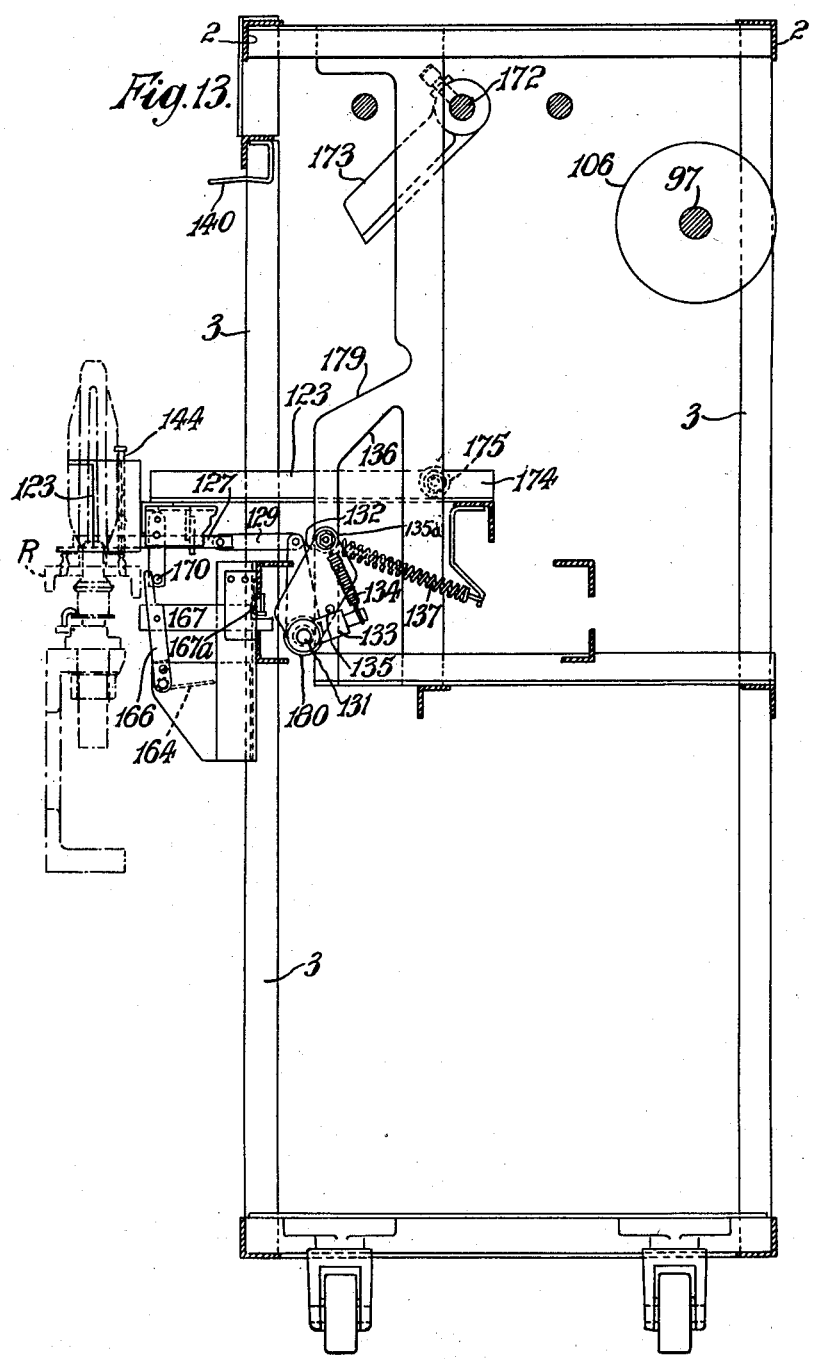
INVENTOR
HAROLD PARTINGTON
BY Francis E. Boyce
ATTORNEY

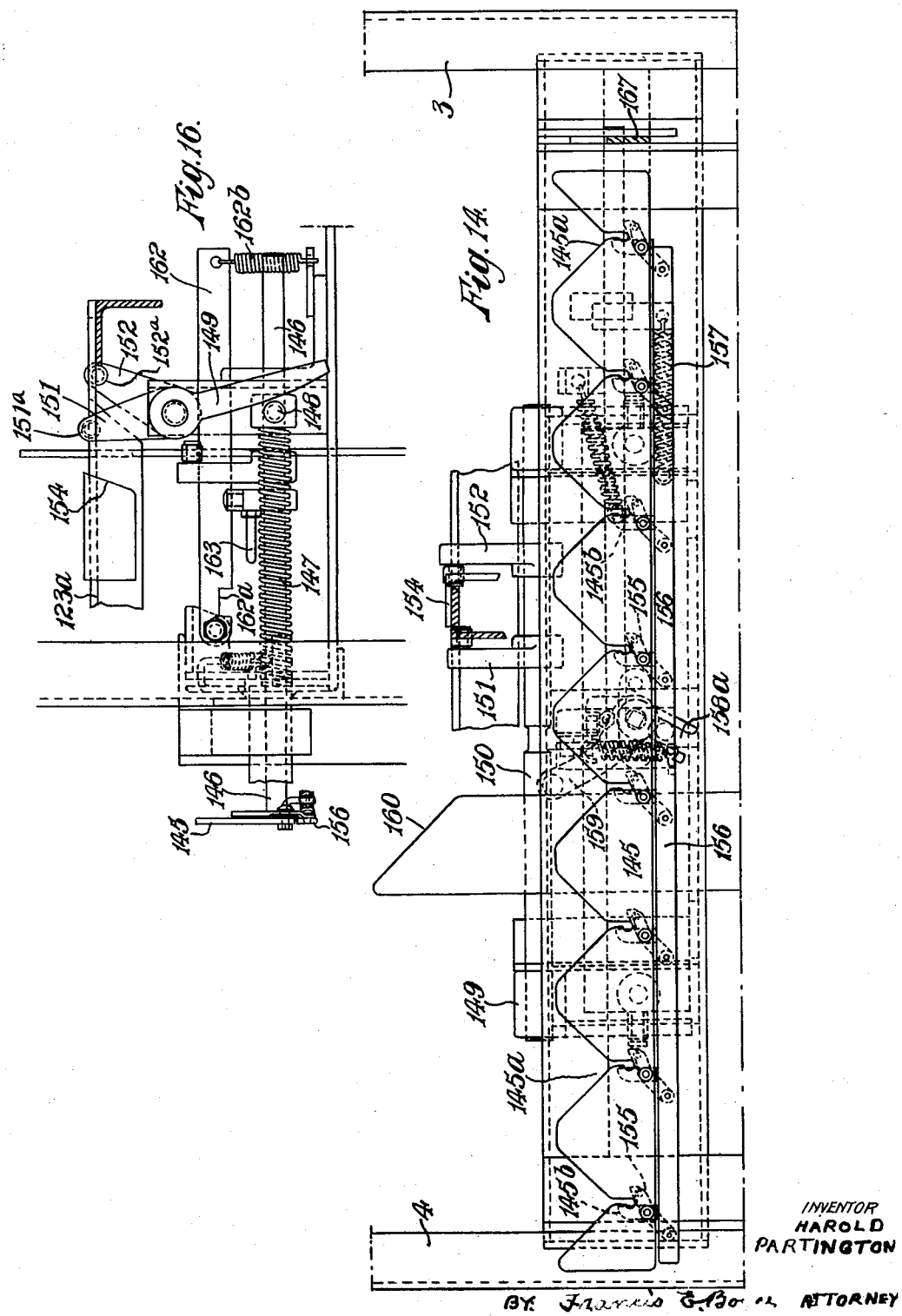

Sept. 29, 1953     H. PARTINGTON     2,653,440
MEANS FOR DOFFING RING FRAMES
Filed Jan. 10, 1950     17 Sheets-Sheet 15
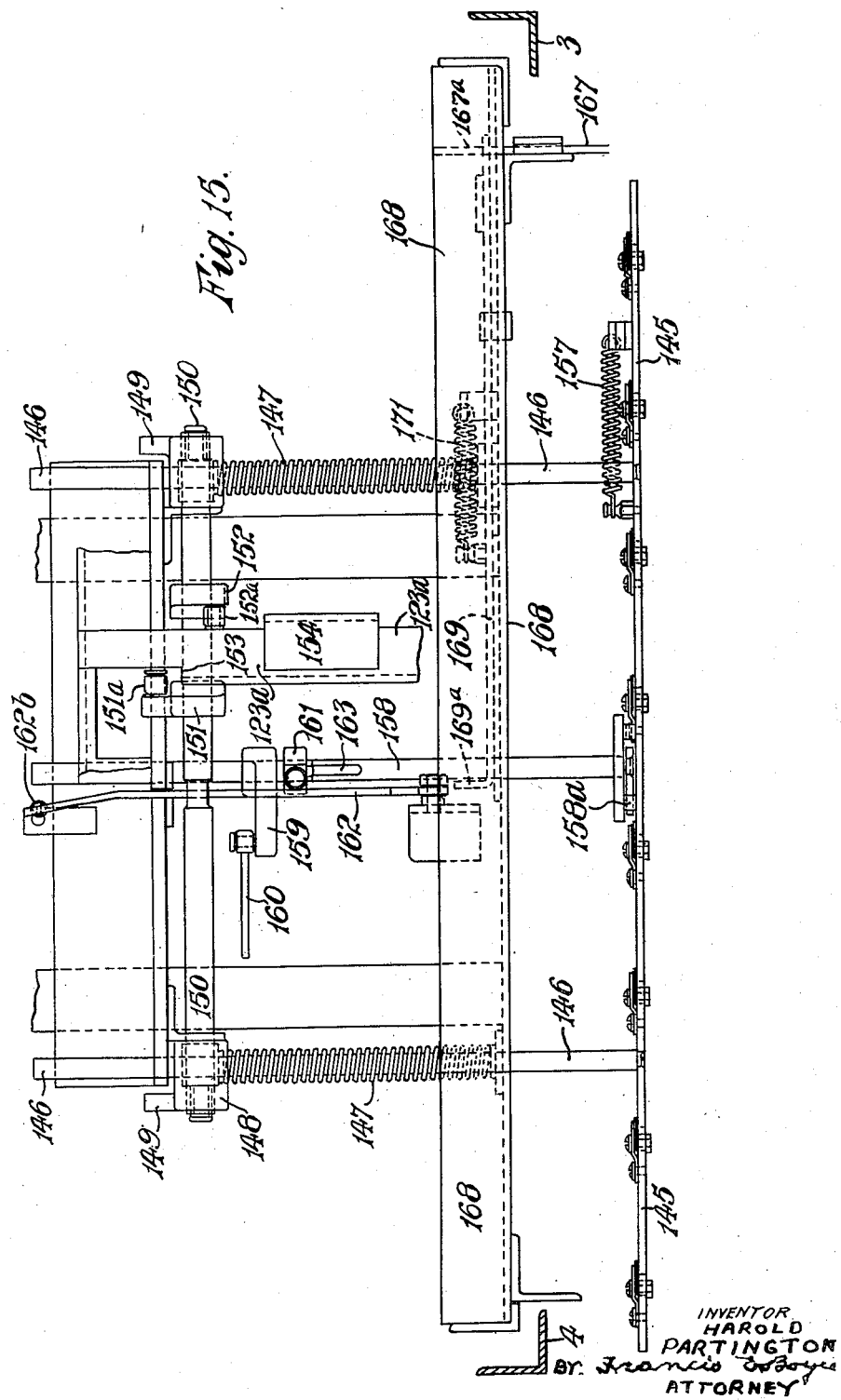
INVENTOR
HAROLD
PARTINGTON
BY Francis O'Boyle
ATTORNEY

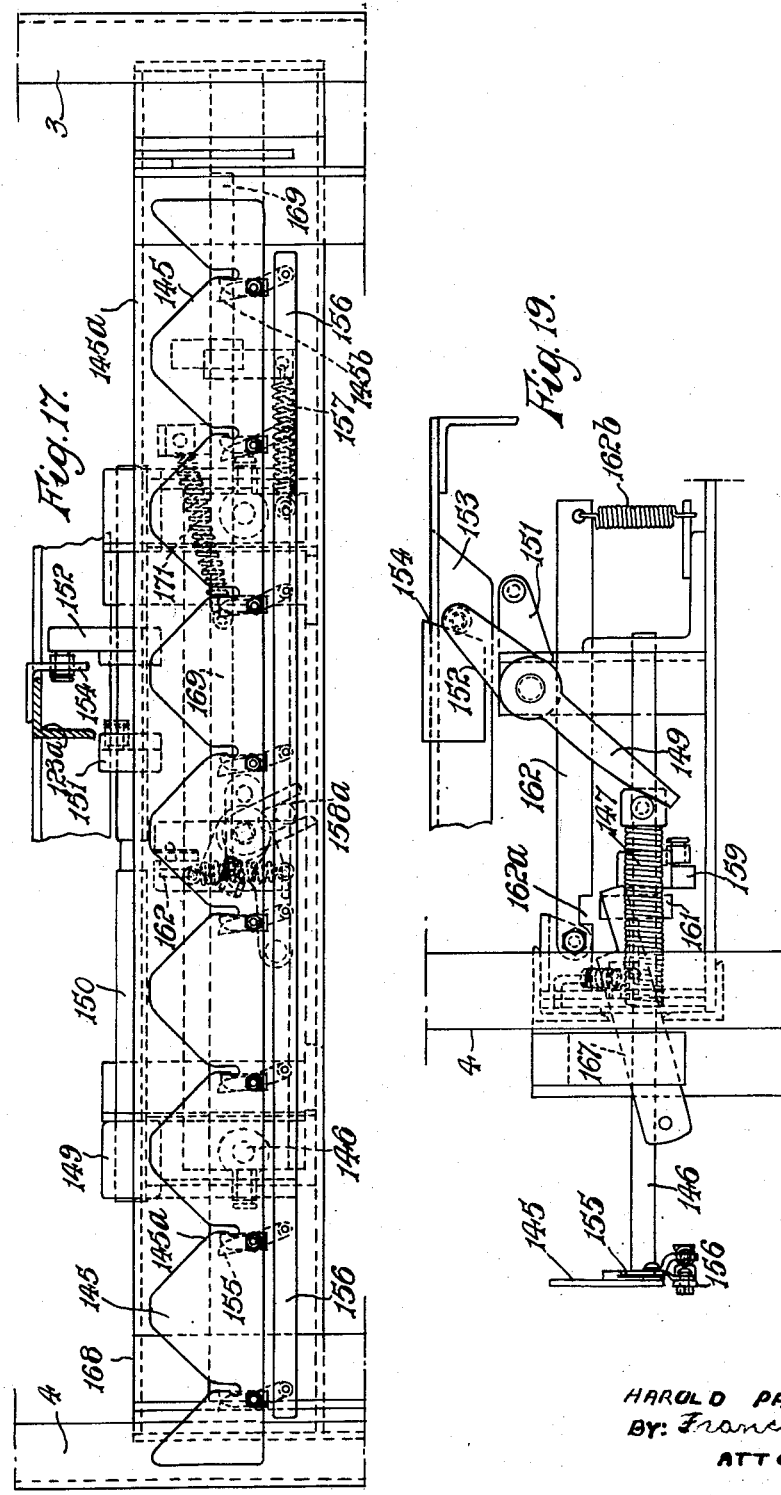

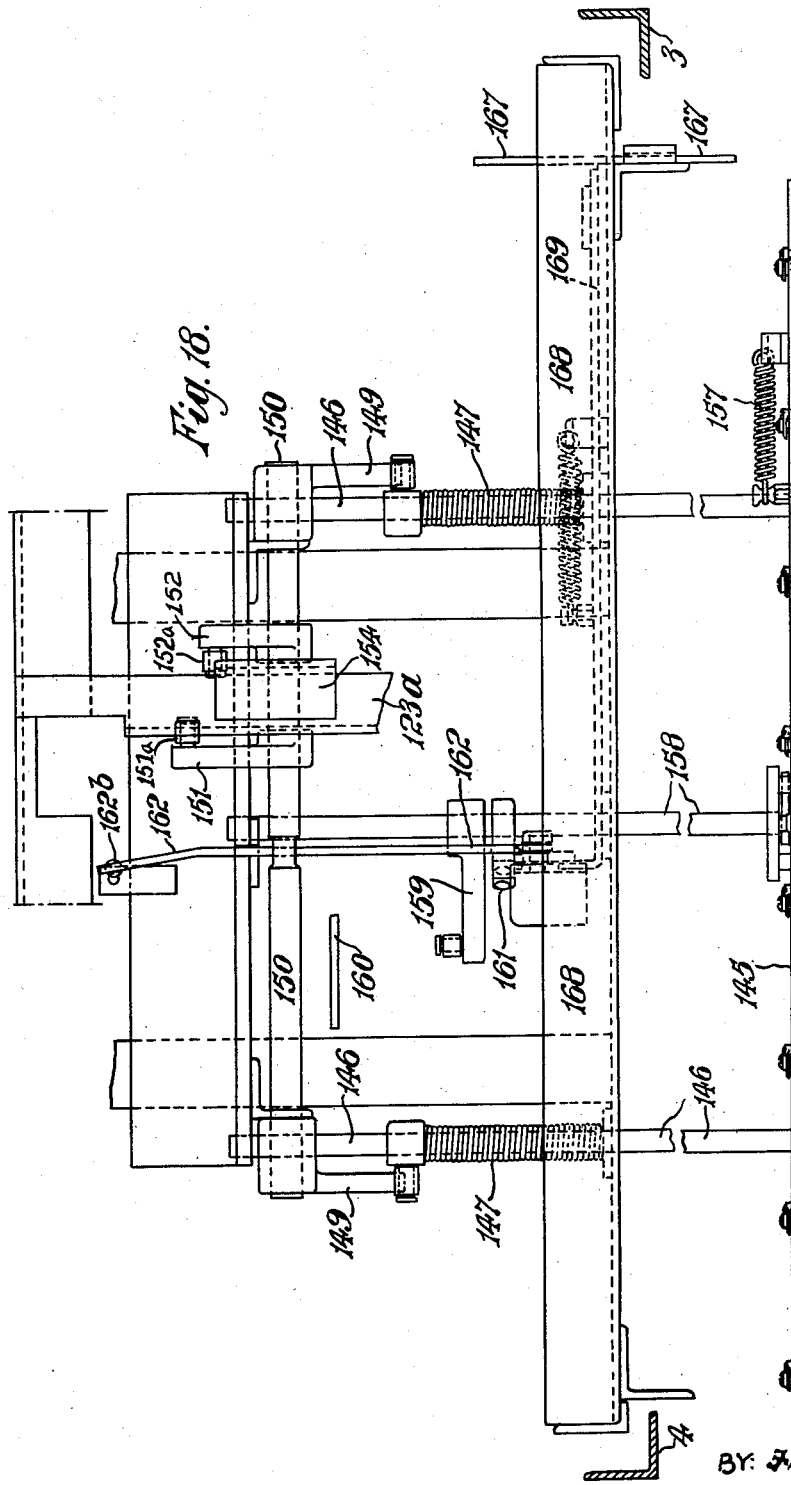

Patented Sept. 29, 1953

2,653,440

UNITED STATES PATENT OFFICE 2,653,440

MEANS FOR DOFFING RING FRAMES

Harold Partington, Chadderton, England

Application January 10, 1950, Serial No. 137,766
In Great Britain January 15, 1949

6 Claims. (Cl. 57—53)

This invention relates to means for doffing ring frames, spinning, doubling, twisting and like machines all herein referred to generically as ring frames, and has for its object to provide improvements in machines which mechanically remove full bobbins from, and place empty bobbins on the ring frame spindles, and thereby reduce the period of stoppage of the ring frame as well as reducing the labour required for removing all the filled bobbins on a frame and replacing them with empty bobbins.

A machine for doffing ring frames in accordance with this invention is traversable along the front of the ring frame step-by-step through successive operative positions and has means for simultaneously removing bobbins from a group of spindles and means for simultaneously donning bobbins on to an adjacent group of spindles in each such operative position. As the machine moves along the ring frame, in each position it places empty bobbins on the spindles of the group from which the full bobbins were removed in the next preceding position.

The term "bobbin" as used herein must be taken as including any form of tubular holder for a package of yarn, such as could be employed with ring frame spindles, whether wooden or plastic bobbins, paper tube or otherwise.

According to the invention also, the said machine has a prime mover thereon which imparts to it a step-by-step movement along the front of the frame, there being means operative at the end of each increment or step of movement to drive mechanism for doffing a group of spindles and simultaneously donning an adjacent group of spindles, and means operative at the end of each doffing and donning operation to initiate the next increment or step of movement.

The machine may be mounted to run on rails at the front of the ring frame, but preferably it will run direct on the mill floor, in which case there will be a guide rail or rails along the front of the ring frame, with releasable means on the machine to engage such guide rail(s) said means allowing disengagement of the machine from the rail(s) if and when it is necessary to get round an obstruction such as a pillar supporting the ceiling. Such rail may also constitute a control member for determining the alternations of (a) traverse along the frame and (b) doffing and donning of bobbins.

The doffing mechanism according to the invention includes a rising and falling structure on which is a horizontally slidable mechanism, the said slidable mechanism carries a device adapted to push the full bobbins upwards off the spindles when such device is lifted by the raising of the slidable member, the said member being also adapted to be projected over spindles before it is lowered and to be withdrawn after it has been raised, and also to become inoperative after withdrawal, and thereby release the removed full bobbins.

According to a further feature of the invention, the said rising and falling structure also carries a cutting mechanism for severing the yarn leading to the doffed bobbins, which mechanism may comprise relatively movable cutters, means for holding them in open position against spring resistance, and means for releasing them to effect the cutting operation at the required time.

The invention may also comprise a supporting member for the released full bobbins, to intercept their fall when the lifting means is withdrawn, which supporting member is removed immediately after the cutting operation, thus preventing the unwinding of a long length of yarn from the falling bobbins before the yarn is cut.

As in known practice, the full bobbins have at their base a number of so-called "doffing coils" of yarn which, as the bobbins are drawn off the spindles, unwind on to the spindle, and are trapped there by the next empty bobbin placed on the spindle. To prevent unwinding of these coils from the spindle, a resilient member is adapted to be brought into engagement with them and, as the machine moves along from one operative position to the next, to rub on the coils of yarn, in a winding direction.

Track wheels on one or more axles are provided, with means for driving them when required, and such wheels, or some of them, may be releasable from their axles so as to allow the machine to be rotated in its own length, say when required to pass a pillar or roof support in its straight-line path.

In order to keep the machine in close juxtaposition with the ring frame, it has rollers on vertical studs to ride on the rear face of the notched rail (or another rail provided for the purpose). The present invention includes provision for the disengagement of these rollers from the rail, say by rotation of those studs about horizontal axes, so that the rollers may be moved from behind the said rail to allow the machine to be guided around a pillar or like obstacle.

The donning mechanism preferably comprises a further horizontally-slidable member or drawer, adapted to be projected over and withdrawn from the spindles, and having compartments each adapted to contain a horizontally-disposed empty bobbin and also having a sliding bottom portion adapted to be operated when the drawer is projected and release the empty bobbins and guide their lower ends on to the spindles, as they fall from the compartments.

The donning mechanism is provided with means for changing the horizontal disposition of the bobbins about to be donned into a vertical disposition. In addition, there may be means in the bobbin-releasing mechanism (by which the bobbins are dropped one by one from each compartment of the hopper) to delay the fall of the tip of the bobbin, so that the bobbin is tilted towards a vertical position in its fall.

A still further feature of the invention comprises means for pressing the empty bobbins on to the spindles on which they have been placed.

In the accompanying drawing, one example of machine according to the invention is illustrated. The machine shown is a first model or prototype, and the primary purpose of the drawings is to illustrate the several functions on which the invention is based, the actual design of the parts being subject to modification for production purposes.

Fig. 3a is a sectional view showing an alternative means for operating the machine.

Fig. 7a is a fragmentary plan of a part of the donning mechanism in the retracted position.

Fig. 13 is a transverse vertical section showing in more detail the means for advancing and retracting the bobbin supporting pins.

Fig. 14 is a front elevation of the cutting mechanism, surrounding parts being omitted, with the cutters retracted and in the loaded or open position.

Fig. 15 is a plan projected from Fig. 14.

Fig. 16 is a sectional end view of the parts shown in Figs. 14 and 15.

Figs. 17, 18 and 19 are views corresponding to Figs. 14, 15 and 16, with the cutters advanced and in the released or closed position.

Figure 1:
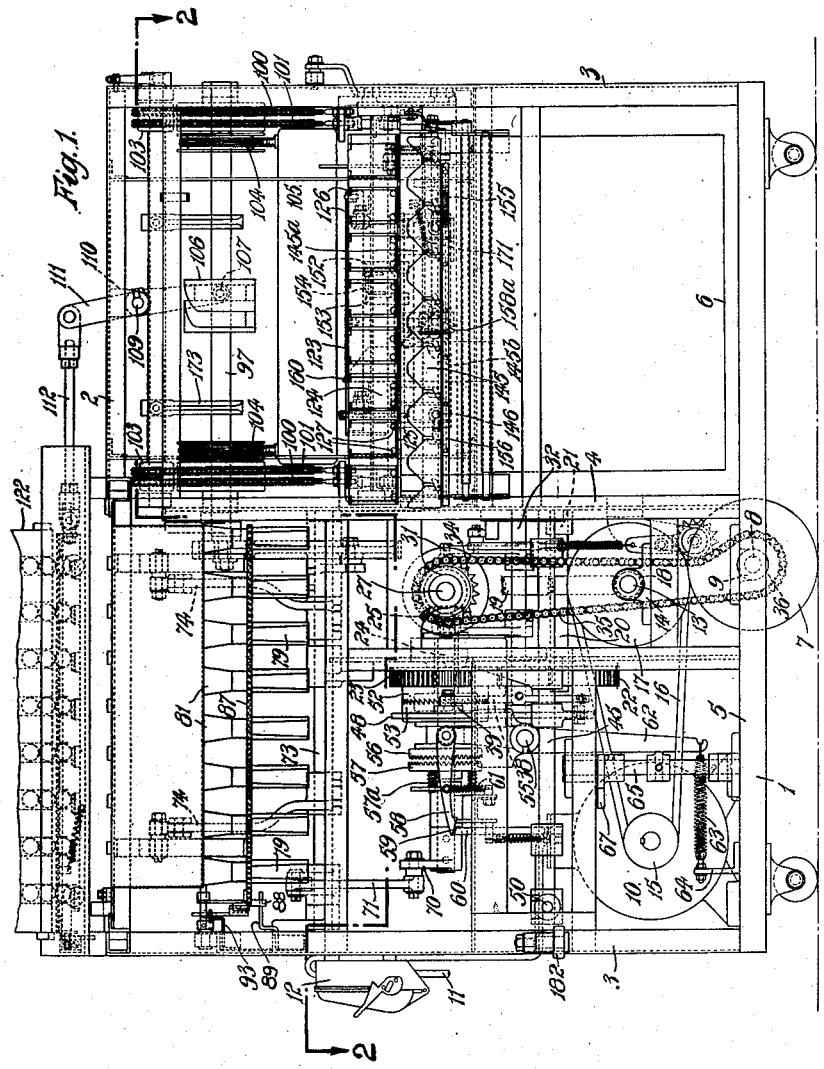
Fig. 1 is an elevation of the machine on the side nearest the ring frame when in use.

As shown, the apparatus comprises a frame or carriage having lower horizontal members 1, upper horizontal members 2 and vertical members 3 and 4. Between the horizontal members 1, at the ends of the apparatus, are platforms or decks 5 and 6, and between those platforms there are track wheels 7 on a spindle 8 mounted in bearings 9 on the lower horizontal members 1. One of the track wheels is permanently secured to the shaft, but the other has a clutch member by which it may be released from or secured to the shaft, at will. When so released, it renders the machine more mobile and dirigible.

The platform 5 carries a driving motor 10 supplied with current by a trailing cable 11 under the control of a stop-and-start switch 12. The said motor 10 drives a cross shaft 13 located in bearings 14 the drive being by means of pulley 15 on the motor shaft, belt 16 and pulley 17 on the cross shaft 13. Cross shaft 13 also carries a worm 18 which meshes with a worm wheel 19 on a short shaft 20 mounted in bearings 21, on which shaft is a toothed wheel 22 driving a similar toothed wheel 23 on a parallel shaft 24. Fixed on the shaft 24, at one end, is a bevel wheel 25 meshing with a similar bevel wheel 26 on a cross shaft 27 mounted in bearings 28.

Splined on the cross shaft 27 is one half 29 of a toothed clutch, integral with which is a collar 30 which receives rollers 31a on the ends of radial arms 31 fixed on a spindle 32. The other half clutch 33 is rotatable on the cross shaft 27, and is secured to a sprocket wheel 34 meshing with a chain 35 which drives a further sprocket 36 on the shaft 8 of the track wheels 7. Behind the half clutch 33 is a compression spring 37 serving as a shock absorber whilst clutching.

On the spindle 32 is fixed a lever 38 the upper end of which carries a roller 39, and the lower end of which is constrained by a tension spring 40 acting between it and a fixed part of the frame. Oscillation of such lever 38 in one direction by means described below, moves the splined collar 30 and half clutch 29 along the cross shaft 27 to complete the drive to the track wheels 7.

Extending from one of the said radial arms 31 on the spindle 32 is a latch member 41 having a hooked end 41a which, when the clutch is closed, hooks over a fixed part 42 of the frame to hold the clutch in engagement until released. Depending from the latch member 41 is a trip member 43 whose lower end lies in the path of a radial projection 44 on a shaft 45; a tension spring 46 being provided, holding such radial projection 44 normally in the raised position to release the clutch.

On the shaft 45 is a projecting arm 47 above which is a further lever 48 loosely mounted on the spindle 32, a spring 49 being provided between a fixed boss on the shaft 45 and the lower end of the lever 48. This lever 48 is cam operated, by means described below. At the end of the shaft 45 is a latching member 50 the end of which projects out of the machine and is adapted to enter successive notches 51a in a rail 51 provided along the front of the ring frame.

Referring back to the shaft 24, the toothed wheel 23 is integral with a half clutch 52, this wheel and half clutch being free on the shaft. The other half clutch 53 is splined on the shaft 24 so as to rotate therewith, and is moved axially by means of a radial arm 54 on a further cross shaft 55, such arm having a yoke 54a at its upper end. The said half clutch 53 is attached to a further and smaller half clutch 56 co-operating with a non-rotary half clutch 57 behind which are shock-absorbing springs 57a. Extending from one limb of the yoke member 54a is a latch 58 with hookshaped end 59 adapted in certain positions to hook over an abutment 60 fixed on the machine frame, a spring 61 being provided to load the latch member 58. The arrangement is such that as the half clutches 52 and 53 are separated, and the half clutches 56 and 57 become engaged, the two clutches are held in such positions by the engagement of the hook 59 of the latch member 58 with the said abutment 60.

Depending from the cross shaft 55 is a lever arm 62 the lower end of which is connected by a tension spring 63 to a bracket 64 on the platform 5. Mounted on such platform 5 is a vertical spindle 65 to which is fixed an arm 66 adapted to engage the lower end of the said depending lever 62.

Also on such vertical spindle 65 is a further arm 67 projecting out of the machine and adapted to be engaged by and pushed inwardly by an obstruction 68 on the rail 51 so as to rotate the said vertical shaft 65 and thereby displace the depending lever 62 against the pull of the spring 63, and in so doing, by rotating cross shaft 55 to separate the half clutches 52 and 53 and bring the latch member 58 into operation to hold them separated.

In Fig. 3a is shown a modification of the means for initiating rotation of the vertical shaft 65. In this modification, the said shaft is shown broken away at 65a and an arm 67a is secured on said shaft and extends toward the vertical web 51c of the rail and on said vertical web are mounted slidable plates 51b in which are formed openings 51c, so that such openings are adjustable for accurately positioning the machine and ensuring operation of the arm 67a at the correct time, it being understood that the arm 67a moves in opposite directions into and out of the openings as the machine moves on. This modification has the advantage that in the event of failure of the latch 58 above described to operate, the clutch members are held in engagement by contact of the arm 67a with the back of the rail web 51c.

Projecting from the half clutch 53 is a cam or nog 69 which, as the half clutch 53 rotates, first displaces the lever 48 which, by depressing the radial arm 47 on the shaft 45 rotates that shaft to lift the latch member 50 out of the notch 51a in the rail 51, and immediately thereafter displaces the lever 38 on the spindle 32 to rotate that spindle and thereby close the half clutches 29 and 33 so as to complete the drive to the track wheels 7. These half clutches are held in the closed position by engagement of the hook 41a with the fixed part 42.

With the motor 10 driving, the machine now moves bodily along the front of the ring frame, the latch member 50 riding on the top of the rail 51, and the parts displaced by arm 67 being held in the retracted position by the latch 58. As the machine approaches the next operative position, the latch member 50 falls into the appropriate notch 51a in the rail 51 to rotate the shaft 45 in the reverse direction and thereby lift the latch member 41 to allow the half clutches 29 and 33 to separate to arrest the machine and at the same time a trip member 45a also carried by shaft 45 lifts the latch 58 clear of the abutment 60 to allow the half clutches 52 and 53 to engage, thus driving the shaft 24.

On one end of the shaft 24 is a small crank 70 which is connected by connecting rod 71 to a radial arm 72 on a further shaft 73 journalled at a higher level in the machine, the rotation of the crank 70 bringing about an oscillatory movement of the said further shaft 73. This further shaft 73 has secured to it, two upwardly-extending radial arms 74 whose upper ends are connected by short links 75 to a rod 76 mounted in a sliding frame, the oscillatory movements of the said shaft 73 bringing about a to-and-fro movement of that frame, in horizontal guides 77 provided in the main frame of the machine, see Fig. 3.

In the rear part of the said sliding frame is a horizontal bar 78 below which are a number of vertical cylindrical guides 79 open at the side facing the ring frame. Above such bar 78 is a corresponding number of tubular guides 80 leading from compartments in a hopper 81, the front wall of the hopper 81 being fixed on the frame, and the rear wall being in sections 81a hinged at their lower edges on a spindle 82 carried in the frame (see Figs. 3, 5 and 6). One end of such spindle 82 is fitted with a radial arm 83 on which is a roller 84 to roll on a cam 85 in the end of the main frame so that, when the slidable frame is in the inner position (as in Fig. 3) the said roller 84 and arm 83 fall, to cause the hinged sections 81a of the compartments to incline rearwardly, in which position it rests upon inclined supporting members 86 in the frame, and as the frame is moved outwardly the cam 85 raises the arm 83 to bring the said hinged sections 81a to the vertical position. On the inner face of the hinged sections 81a are guides which register with the divisions between the compartments of the hopper 81.

Figure 7:
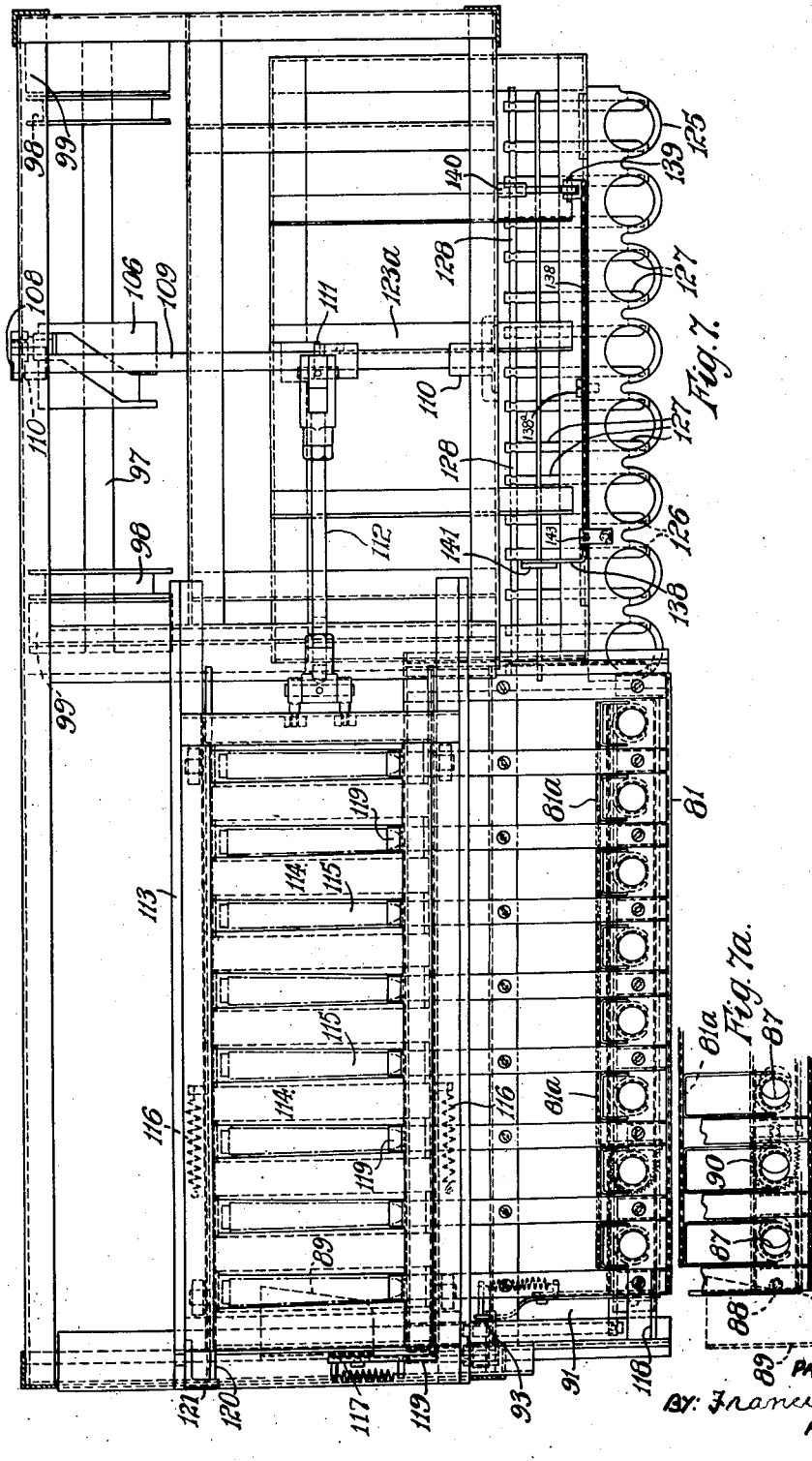
Fig. 7 is a plan, with the magazine removed and with the donning and doffing mechanism both advanced, interior parts of the machine being omitted.

Slidable in the said horizontal bar 78 between the tubular guides 80 and 79 above and below it, is an apertured plate 87 having an aperture for each guide 80 (see Figs. 7 and 7a). Depending from such plate 87 at one end, is a pin 88, which, as the slidable frame approaches the inner position, is displaced by a cam 89 on the main frame of the machine to put the apertures in the sliding plate 87 out of register with the openings in the tubular guides 80 so as to support bobbins lying in those guides (see particularly Fig. 7a).

Figure 3:
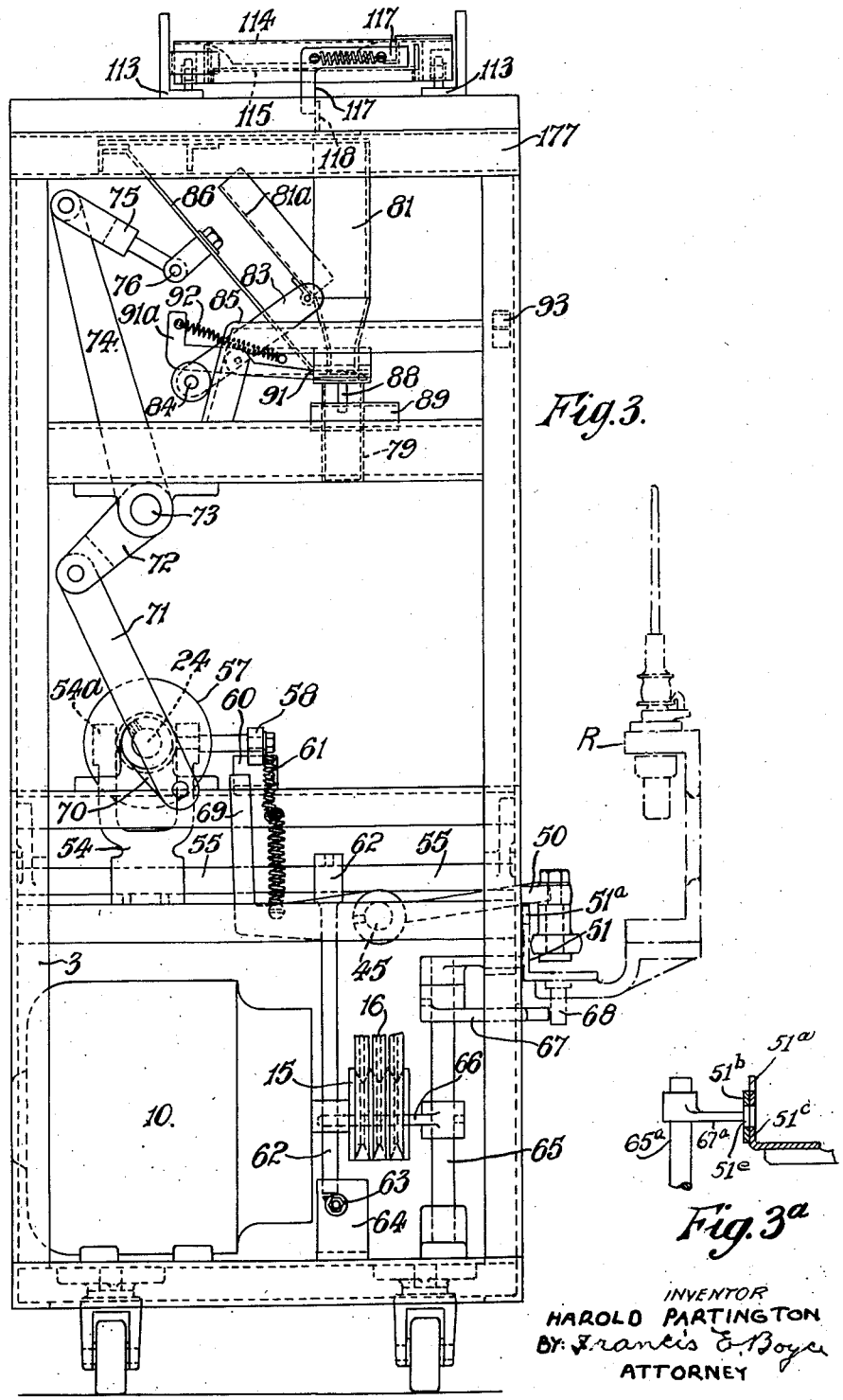
Fig. 3 is an end elevation at the donning end with the donning mechanism retracted and the magazine omitted, distant parts of the machine being omitted for the purpose of clarity.

There is a spring 90 tending to move the apertured plate 87 into a position where the apertures in it are in register with the guides 80 to allow the bobbins to fall through but, as the plate 87 is pushed inwardly by the said pin 88 and cam 89, a hinged trip lever 91 falls across the end of the plate 87 to obstruct its return, the trip lever being held there by a spring 92 (see Fig. 3). As the sliding frame approaches its outermost position an upstanding part 91a on the hinged trip lever 91 is arrested by a fixed projection 93 on the main frame, causing the lever 91 to rotate about its pivot and move clear of the end of the apertured plate 87 whereupon the said spring 90 moves the plate 87 outwardly so that the apertures in it are in register with the guides 80 and the bobbins fall through.

Figure 4:
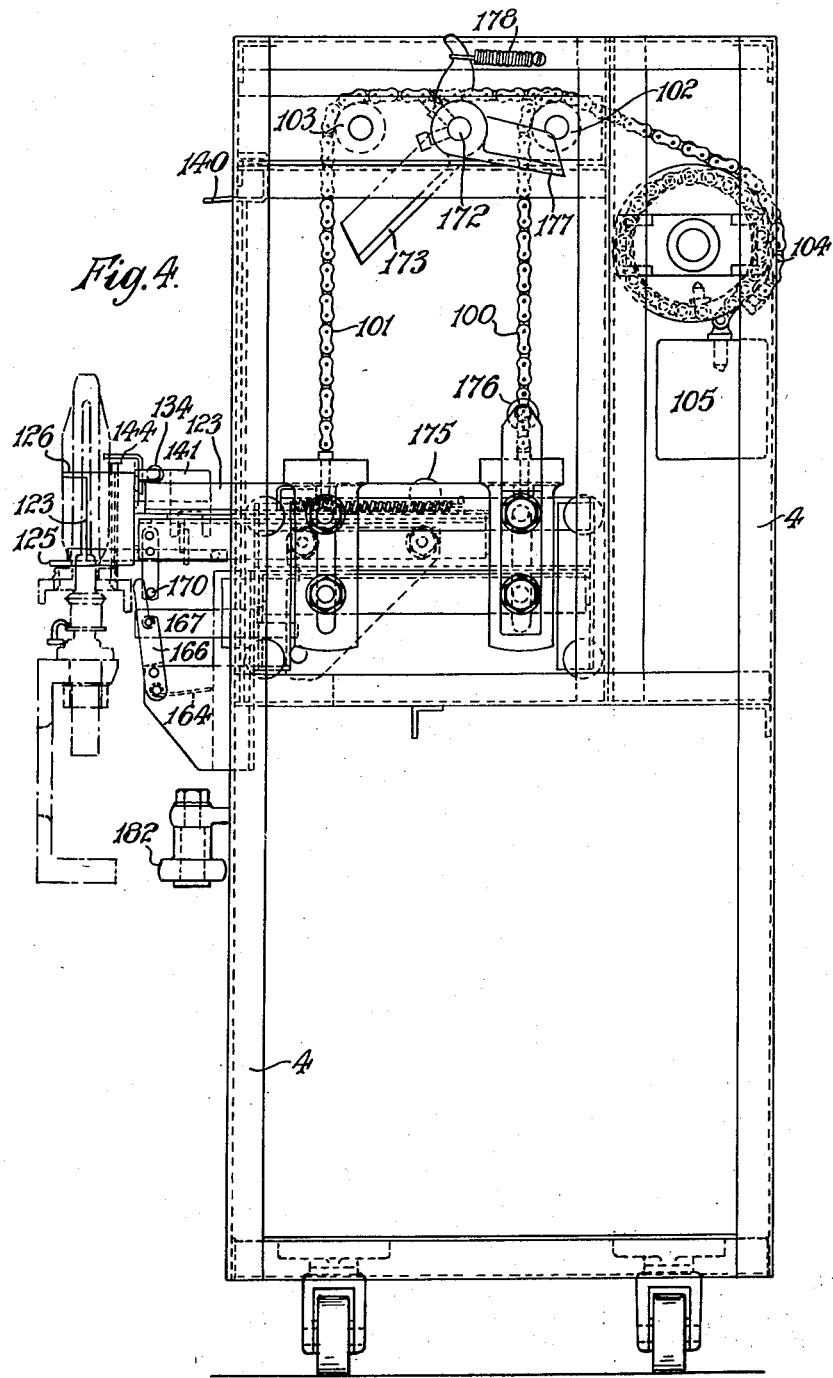
Fig. 4 is an end elevation at the doffing end with the doffing parts lowered on to the bobbins, distant parts being omitted here, also.

Returning now to the shaft 73, there is a fixed toothed wheel 94 meshing with a smaller idler wheel 95 which in turn meshes with a small toothed wheel 96 on a shaft 97 mounted in the main frame, and having secured thereto the sheaves 98 and 99 to which are secured ends of roller chains 100 and 101 which pass over guides 102 and 103 respectively, and are secured to the rear and intermediate parts of a rising and falling platform. Further roller chains 104 attached to the sheaves 98 and 99 suspend a counter-balance weight 105 to counteract the weight of the rising and falling platform (see Fig. 4).

Also fixed to the shaft 97 is a cylindrical cam 106 in the groove of which runs a bowl 107 fixed on the end of a radial arm 108 secured to the rear end of a cross shaft 109 mounted in bearings 110 under the top part of the main frame. This cross shaft 109 has an upstanding crank 111 to which one end of an adjustable connecting rod 112 is attached, the other end of that rod being connected to a bobbin release device mounted on rollers to reciprocate in guides 113 as the said crank 111 moves to-and-fro under the influence of the cylindrical cam 106 (see Fig. 7).

The bobbin release device has upper and lower slotted parts, 114, 115, each slot being of a size to allow an empty bobbin to pass therethrough horizontally (see Fig. 7) and there is a slot in each part 114, 115 for each compartment in the said hopper 81. Normally, the lower slotted part 115 is held in a position where its slots are out of register with the slots in the upper part 114 and they are held in that position against the pull of springs 116 by a latch member 117 mounted on the upper part 114 and obstructing the movement of the lower part 115.

Figure 5:
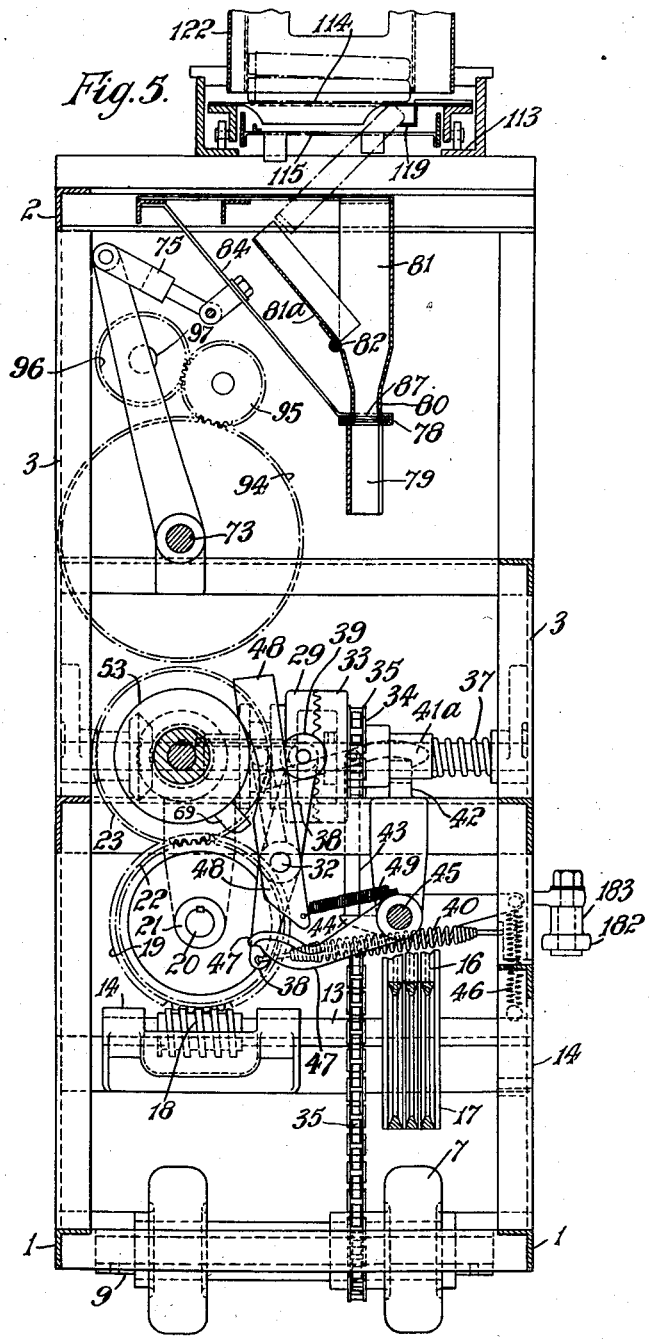
Fig. 5 is a transverse vertical section on the line 5—5, Fig. 2, with the donning mechanism retracted.
Figure 6:
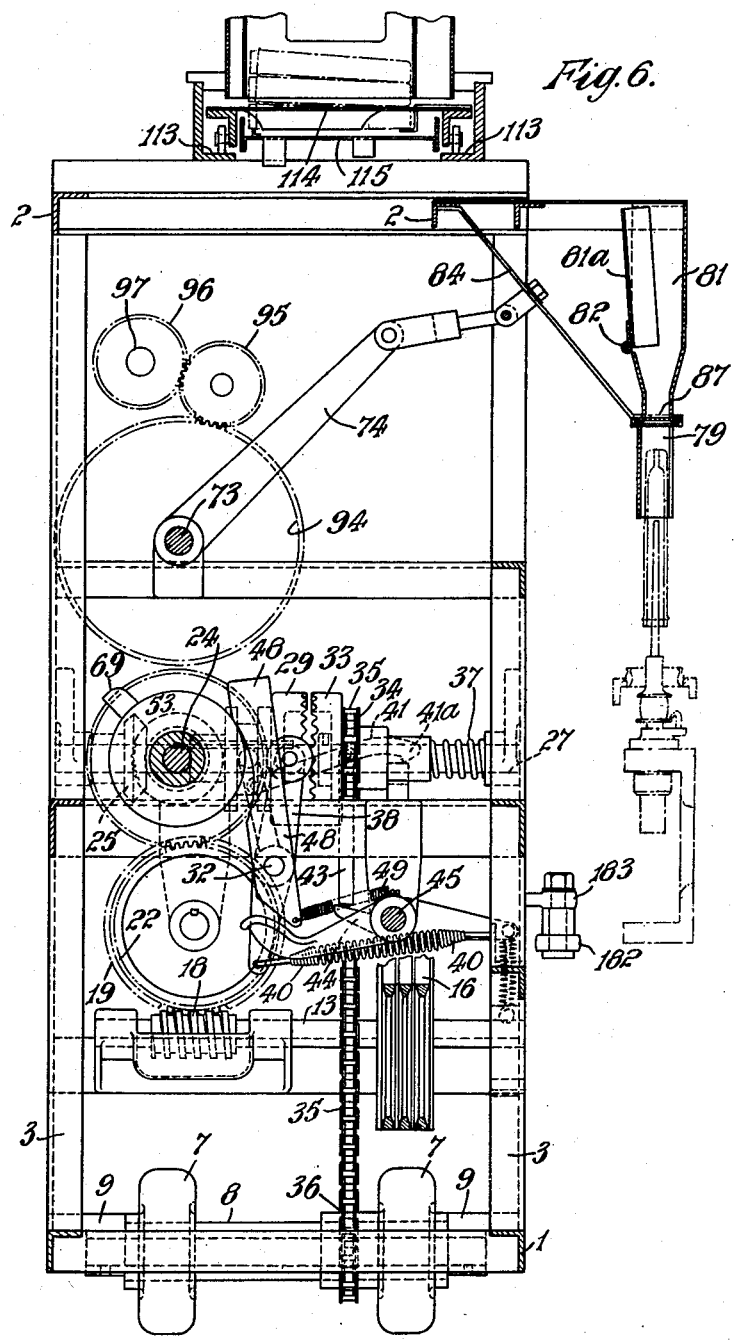
Fig. 6 is a view similar to Fig. 5, but with the donning mechanism advanced.

As the said sliding frame reaches the innermost position such latching member 117 is met by a lug 118 on the sliding frame and is caused to move clear of the lower part 115 of the bobbin release means so that the two sets of slots come into register, and the bobbins in the upper slots fall through the lower slots on to the backwardly-inclined rear sections 81a of the compartmented hopper 81 (see Fig. 5). At one end of the slots in the upper part 114 there are projecting fingers 119 which delay the fall of the corresponding end of the bobbins and thereby cause the bobbins to assume a vertical position as they fall.

As the sliding frame moves outwardly and the inclined sections 81a are brought to the vertical position, the bobbins lying thereon become enclosed in the individual compartments of the hopper 81 and rest on the out-of-register apertured plate 87 until, at the end of the movement of the sliding frame, plate 87 is displaced to allow the bobbins to fall through, as described above. There is a projection 120 on one end of the lower part 115 of the bobbin release mechanism which, as such mechanism is moved by the cranks, is obstructed by a lug 121, so that, although the upper part 114 continues to move, the lower part 115 remains stationary until the slots in the two parts are again out-of-register, whereupon they become latched in that position by the latch member 117.

There is a bobbin magazine 122 mounted above the release mechanism, this magazine having vertical compartments for horizontally-disposed empty bobbins, one such compartment for each compartment in the said hopper 81. The magazine is stationary on the machine, and the bobbin release mechanism moves to-and-fro below it by reason of the crank 111, and the movement of the upper part 114 alternately obstructs and releases the lowermost bobbin in each compartment of the magazine, so that they fall from the compartments, and are then arrested by the lower part 115 of the bobbin release mechanism until such part is released by part 118 displacing trip lever 117, and the said bobbins are allowed to fall, as above explained.

Figure 2:
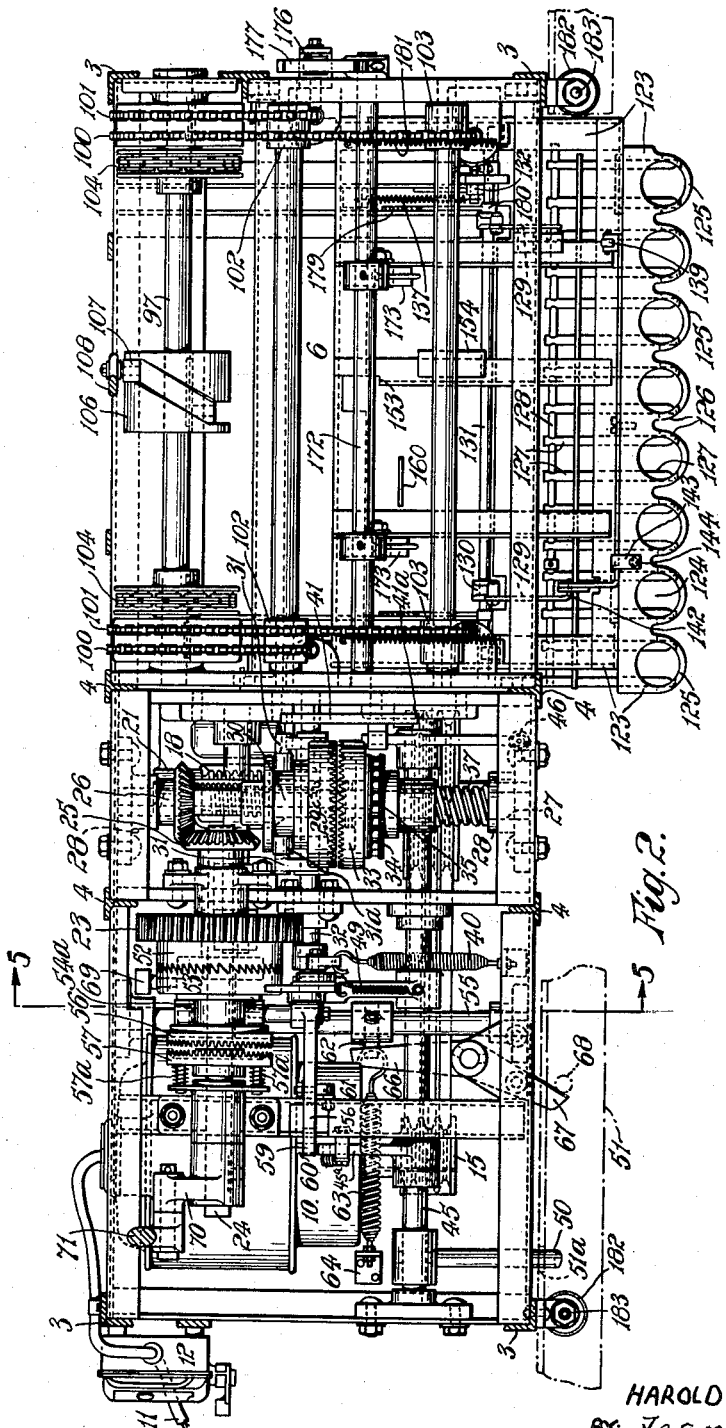
Fig. 2 is a sectional plan on the line 2—2, Fig. 1, and showing a part of the ring frame in broken lines.

In the said rising and falling platform is a slide 123 which has a vertical concavity 124 for each of the eight bobbins to be doffed (see Figs. 1 and 2). The lower part of each concavity 124 has a forwardly-extending hoop or ring 125, whilst the upper part has curved horns 126. For each such concavity 124 there is a pair of forwardly-slidable, bobbin-supporting pins 127, the several pins being connected to a common push rod 128, which in turn is connected by links 129 to the upper ends of levers 130 on an oscillating shaft 131. The said shaft carries two further arms 132, 133 (see Fig. 13) whose outer ends are connected together by a tension spring 134, and a peg 135 on the arm 132, which arm is loose on the shaft 131, forms a stop to limit the movement of the other arm 133 and of the shaft 131, under the influence of the said spring 134. The free end of the loose lever 132 is fitted with a bowl 135a to engage a stationary cam 136 as the frame descends, and a further tension spring 137 counteracts the effect of the cam 136.

Pivoted at 138a at the back of the slide 123 is a trip lever 138, one end of which carries a bowl 139 to engage a stationary cam 140 on the frame, whilst the other end is turned inwardly and carries a stop member 141 of inverted U-shape, the inner limb of which lies in the path of an inturned part 142 of the adjacent link 129 which connects the said push rod 128 to its lever 130. The last-mentioned end of the trip lever 138 has a finger 143 lying over the top of a slidable pin 144 whose lower end projects below the slide 123 and is adapted to be displaced vertically by the ring plate R of the spinning machine as the slide 123 approaches its lowest position (see Fig. 10).

Figure 10:
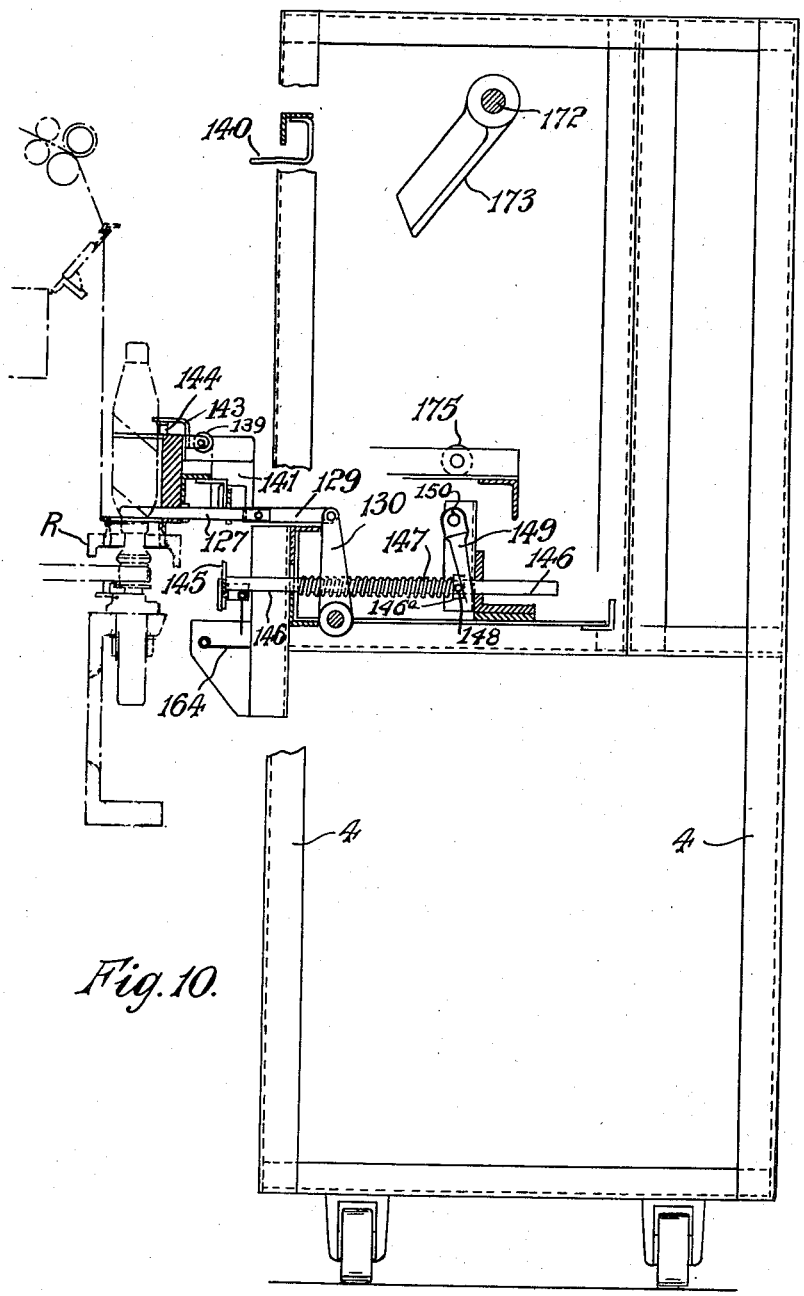
Fig. 10 is a similar view showing the advanced parts lowered on to the bobbins, and the bobbin supporting pins shot-out below the bobbins.

In operation, the bobbin supporting pins 127 are normally retracted behind the concavity 124 in the slide 123 (as in Fig. 8) and as the slide 123 reaches its lowest position the trip lever 138 is rocked by the slidable pin 144 lifting the stop member 141 out of the path of the said inturned part 142 of the link 129 and allowing the spring 134 between the two levers 132, 133 on the oscillating shaft 131 to rotate that shaft and eject the bobbin supporting pins 127 forwardly of the concavities 124 to a position below the wound package on the bobbin (as in Figs. 10 and 13). As the slide 123 is drawn back, after the rising and falling platform and full bobbins has been raised, by rotation of the shaft 97 the oscillating shaft 131 is held stationary by the rear limb of the U-shaped stop member 141 engaging behind the inturned part of the adjacent link 129 so that continued raising of the platform stresses the spring 137 attached to the end of the loose lever 132. Eventually, the trip lever 138 is rocked by engagement of its bowl 139 with the fixed cam 140, thus raising the U-shaped member 141 and releasing the oscillating shaft 131 so that the said spring 137 pulls back the supporting pins 127. The stop member 141 refalls in front of the inturned end of the adjacent link 129 as soon as the trip lever bowl 139 leaves the fixed cam 140 as the slide 123 begins to move forward again.

A cutting arrangement for the threads extending from the doffed bobbins to the spindles on the ring rail comprises a bar 145 with V-notches 145a in its upper edge, this bar being fixed on the forward ends of spindles 146 slidable in and out of the rising and falling platform. These spindles 146 carry compression springs 147 acting between a fixed part of the machine frame and nuts or collars 146a near the inner ends of the spindles 146. Near the inner extremities of the spindles 146 there are projecting studs carrying bowls 148 engaged by depending arms 149 on a further oscillating shaft 150, the latter carrying two fixed arms 151, 152 with projecting bowls 151a, 152a to engage cams 153, 154 on a member 123a extending from the slide 123.

As the slide 123 is moved inwardly with the member 123a its said cams 153, 154 engage the bowls on the fixed arms 151, 152 to rotate the oscillating shaft 150 by means of the radial arms 149, and thereby pushes the fixed cutter bar 145 outwardly at the same time compressing the said spring 147 on the spindes 146. As the slide 123 again moves outwardly, and the stop member 141 is moved away from link 129, these springs 147 assert themselves to rotate the shaft 150 in the opposite direction and also to move the fixed cutter bar 145 inwardly. The fixed bar 145 carries a fixed blade 145b at the bottom of each notch 145a, the edge of each such blade overlying the adjacent notch.

Pivoted behind the fixed cutter bar 145 adjacent the bottom of each V-notch 145a is a movable cutter blade 155 and the lower ends of all the blades 155 are pivoted to a bar 156 which is pivotally suspended and longitudinally slidable below the fixed cutter bar 145. A tension spring 157 is provided acting between the slidable and fixed bars, tending to move the cutters to the closed position. A further spindle 158 moving with the cutter bar 145 is rotatable and has a pin and slot connection at 158a with the slidable bar 156 so that its rotation in one direction moves the slidable bar, endwise against the resistance of the spring 157 to open the cutters. Such rotation of the said spindle 158 to open the cutters against the resistance of the said spring is brought about by means of a radial arm 159 on that spindle engaging a fixed cam 160 as the rising and falling platform descends. On the rotatable spindle 158 is a latch member 161 which, when the cutters are opened as aforesaid, is held against return by a trip lever 162 which has a notch 162a near its outward end. Said latch 161 also carries a forwardly-extending pin 163 for a purpose described below.

As the rising and falling platform is raised, the radial arm 159 leaves the cam 160, but continues to be held by the latch 161 and trip member 162 until, as the cutters are moved outwardly, as aforesaid, the latch member 161 comes opposite the notch 162a in the trip member 162 and is released, whereby the spring 157 between the fixed and slidable bars of the cutting arrangement closes the cutters to sever the yarn. The inner end of the trip member 162 is held down yieldably by spring 162b.

Pivoted on the frame of the machine and below the concavities 124 in the slide 123 when the slide is in the retracted position, is a hinged plate 164, the pivot 165 of which carries a radial arm 166 (see Fig. 4) whose upper end is pivoted to a latch member 167 sliding in and out of the machine frame, and having its inner end notched. Slidable longitudinally in the frame behind the fixed bar 168 is a trip member 169 the outer end of which normally lies in the path of the shoulder 167a on said latch 167 (see Fig. 15) to hold the hinged plate 164 in a horizontal position below the concavities 124. The inner end of the trip member 169 is bent inwardly at 169a and, when the cutting mechanism is in the forward position, lies alongside the said pin 163 projecting from the latch 161 which holds the cutter open and, as that latch 161 is released at the aforesaid notch 162a such pin 163 engages the inturned end of the trip member 169 to displace that member longitudinally out of the path of the shoulder 167a on the latch 167 associated with the hinged plate 164, thus allowing that plate to fall.

The two cams 153, 154 on the bar 123a of the slide, which move the cutting mechanism outwardly, are timed to have a dwell period between their respective operations. The first cam 153 moves the cutting mechanism outwardly for the major part of its movement, and thereafter the bobbin-supporting pins 127 are withdrawn from below the bobbins, as described above, and the bobbins fall on to the horizontal hinged plate 164. Immediately thereafter the second cam 154 comes into operation to advance the cutting mechanism a little further so that its latch 161 is released by the notch 162a and simultaneous cutting of the yarn and release of the horizontal plate 164 occurs, to allow the bobbins to fall into a receptacle (not shown) provided on the deck 6. For re-setting the horizontal plate 164 there is a stop member 170, on the frame which obstructs the radial arm 166 as the cutting mechanism is drawn inwards until, when the latch member 161 is clear from the trip member 169 the latter is returned to latching position by a spring 171.

On the top of the machine is a third oscillating shaft 172 on which are two depending rocker arms 173 and on members 174 of the slide are co-operating bowls 175. On the rising and falling platform, at the end of the machine, is a thrust member 176 which, as the platform approaches its top position, engages a lever 177 on the said oscillating shaft 172 to rock such shaft against the pull of a spring 178 (see Fig. 4) and the bowls 175 on the slide, then being in the path of the depending rocker arms 173, the slide is pulled inwards by those arms. Forward movement of the slide is effected by fixed cams 179 in the machine frame engaging bowls 180 on the first-named oscillating shaft 131. Springs 181 may be provided to assist outward movement, if required.

In order to keep the machine in close juxtaposition with the ring frame, it has rollers 182 on vertical studs 183 to ride on the rear face of the notched rail 51. The present invention includes provision for the disengagement of the rollers 182 from the rail 51, say by rotation of those studs about horizontal axes, so that the rollers may be lifted from behind the said rail to allow of the machine being guided around a pillar or like obstacle.

The operation of the machine is as follows: At the completion of operation in one position on the ring frame the parts are in the following positions: The rising and falling platform of the doffing device is in the raised position, and the slide 123 thereon is in the retracted position, the bobbin lifting pins 127 having been released to their inward position by engagement of the roller 135 on the trip lever 132 with the fixed cam 136. Also, the cutters are in the outward position with the movable cutter-operating bar loaded in the cutter-open position. The donning device is in the retracted position, with a bobbin lying on each of the sections 81a below each slot in the magazine, the bobbins in the magazine being supported by the upper part 114 of the bobbin release mechanism. The latching member 50 is in a notch 51a in the rail 51.

With the motor driving, the cam or nog 69 on the half clutch 53 displaces the lever 48 to rotate the shaft 45 and lift the latching member 50 out of the notch 51a in the rail 51, and the said cam 69 thereafter operates lever 38 to clutch the mechanism at 29, 33 to complete the drive to the track wheels 7 so that the machine begins to move along the front of the ring frame. As the machine begins to move sideways, the arm 67 is displaced by the obstruction 68 on the rail 51, to de-clutch parts 52, 53, which parts are held de-clutched by latch 58. When the latching member 50 comes opposite the next notch 51a in the rail 51 it falls therein, and thereby trips the mechanism to de-clutch the drive to the track wheels 7, and to trip the latch 58 to engage the clutch 52—53 for the drive to the rising and falling platform etc.

Figure 8:
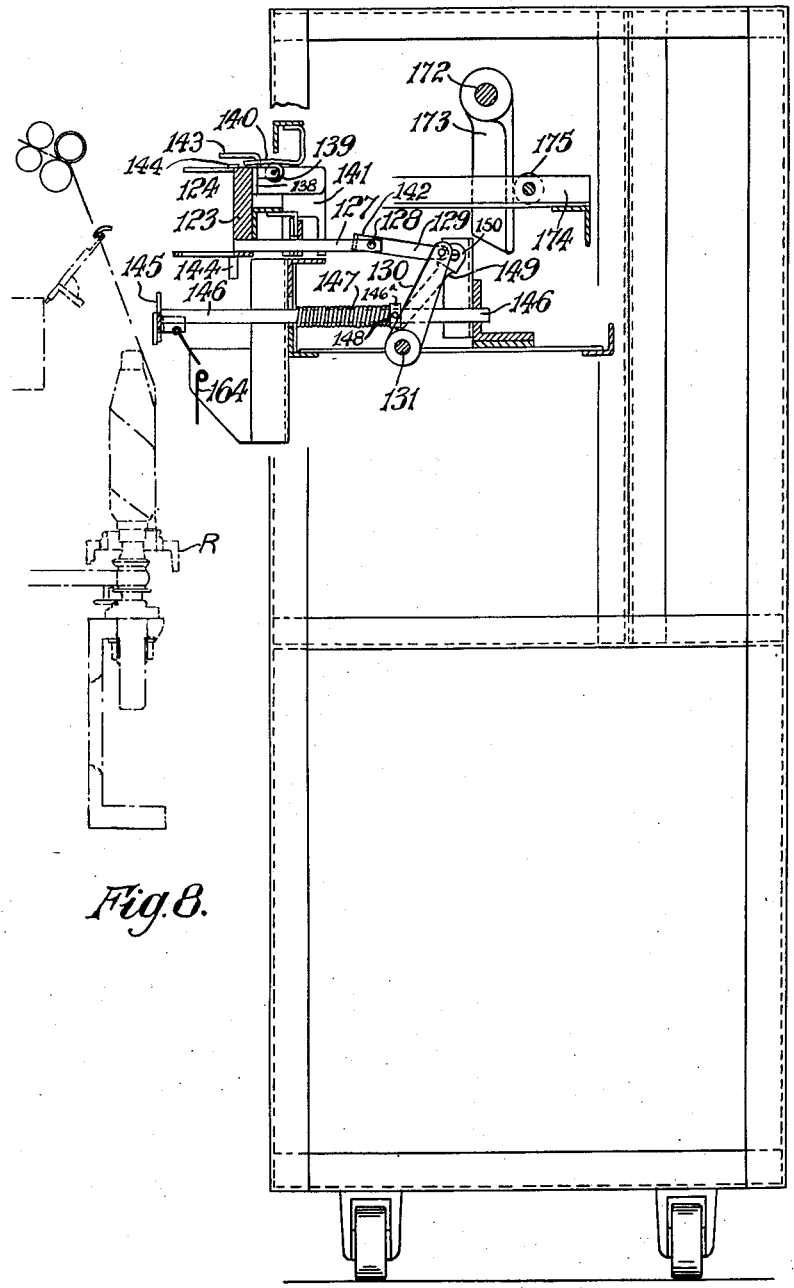
Fig. 8 is a transverse vertical section through the doffing end of the machine illustrating the doffing mechanism in the position occupied at the completion of one doffing operation and ready for the next.
Figure 9:
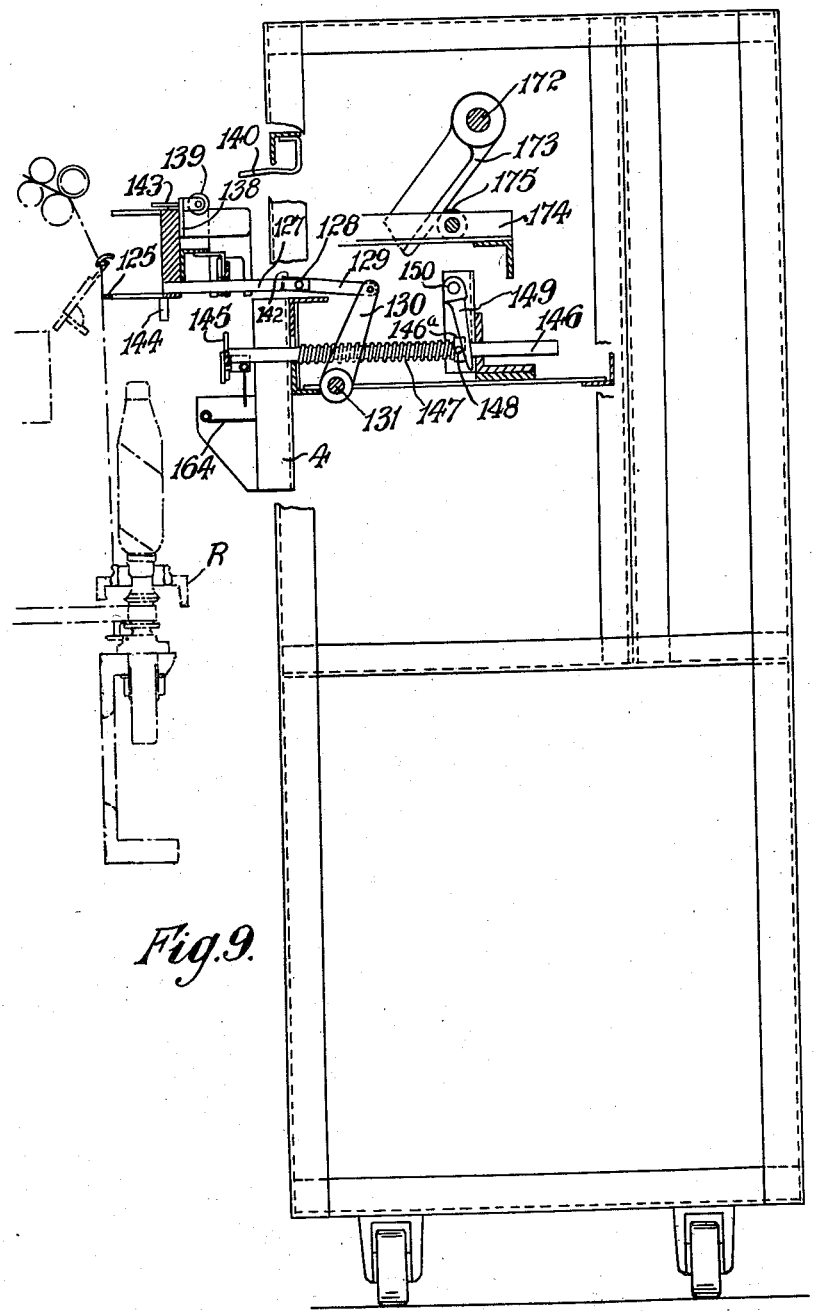
Fig. 9 is a view similar to Fig. 8, showing parts of the doffing mechanism advanced over the bobbins to be doffed, and the cutting mechanism retracted.

The doffing parts are now in the positions shown in Fig. 8. The platform now begins to descend, during the first part of which movement the slide 123 is pushed outwardly over the spindles by cam 179 and bowl 180, and the cutters are drawn back by springs 147. The parts are now in the position shown in Fig. 9, and it will be seen that the plate 164 has assumed the horizontal position.

Figure 11:
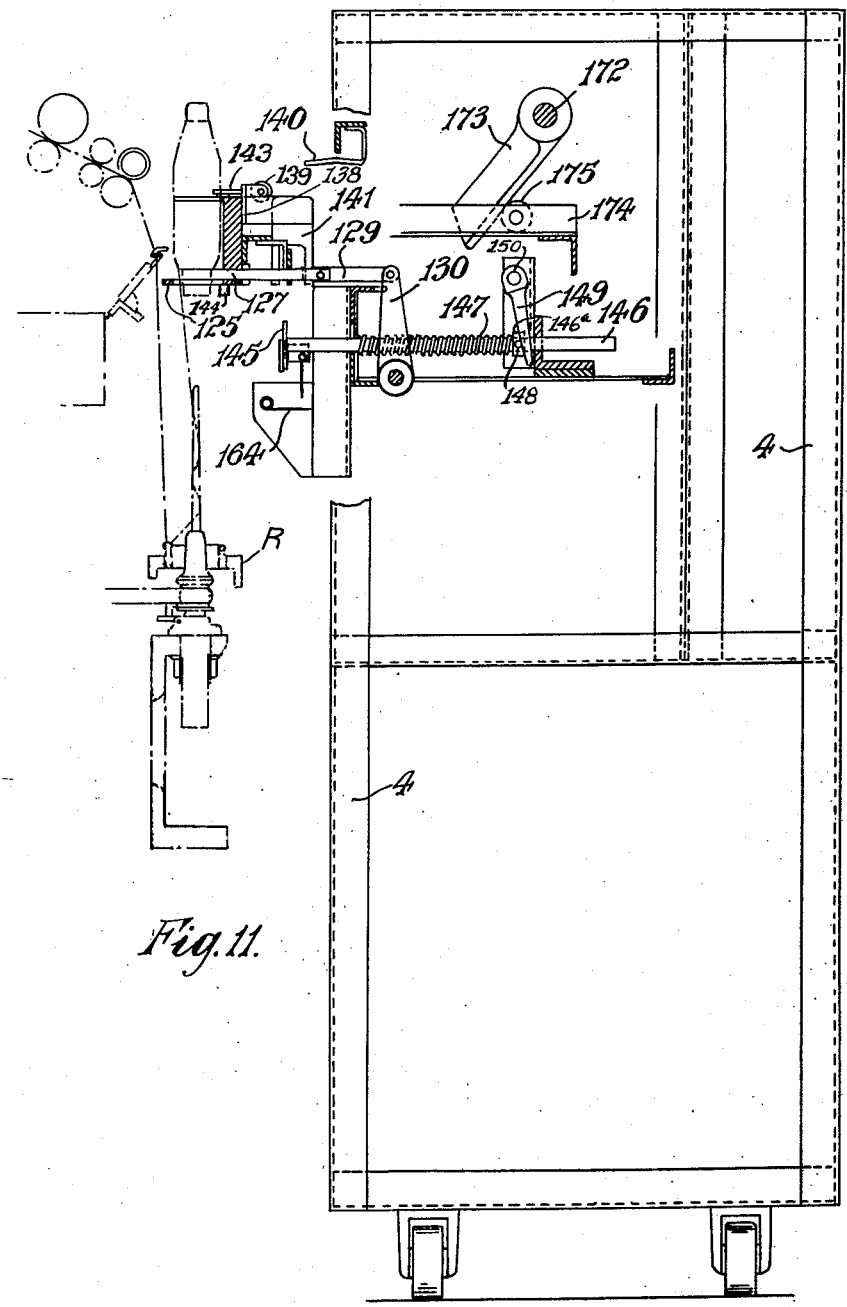
Fig. 11 is a similar view showing the bobbins lifted from the spindles.

As the platform reaches its lowermost position the pin 144 is obstructed by the ring rail R to release the bobbin lifters 127, as described above. The parts are now as shown in Fig. 10, and it will be seen that the hoops 125 have displaced the oncoming yarn and the travellers out of the way and clear of the slide to allow the doffing of the spindles to be effected without interference. The rising and falling platform is now raised and the bobbins are lifted from the spindles by the pins 127, during which process the usual doffing coils from the lower ends of the bobbins have wound themselves around the spindles as shown in Fig. 11, the platform in this figure having not quite reached its uppermost position.

Figure 12:
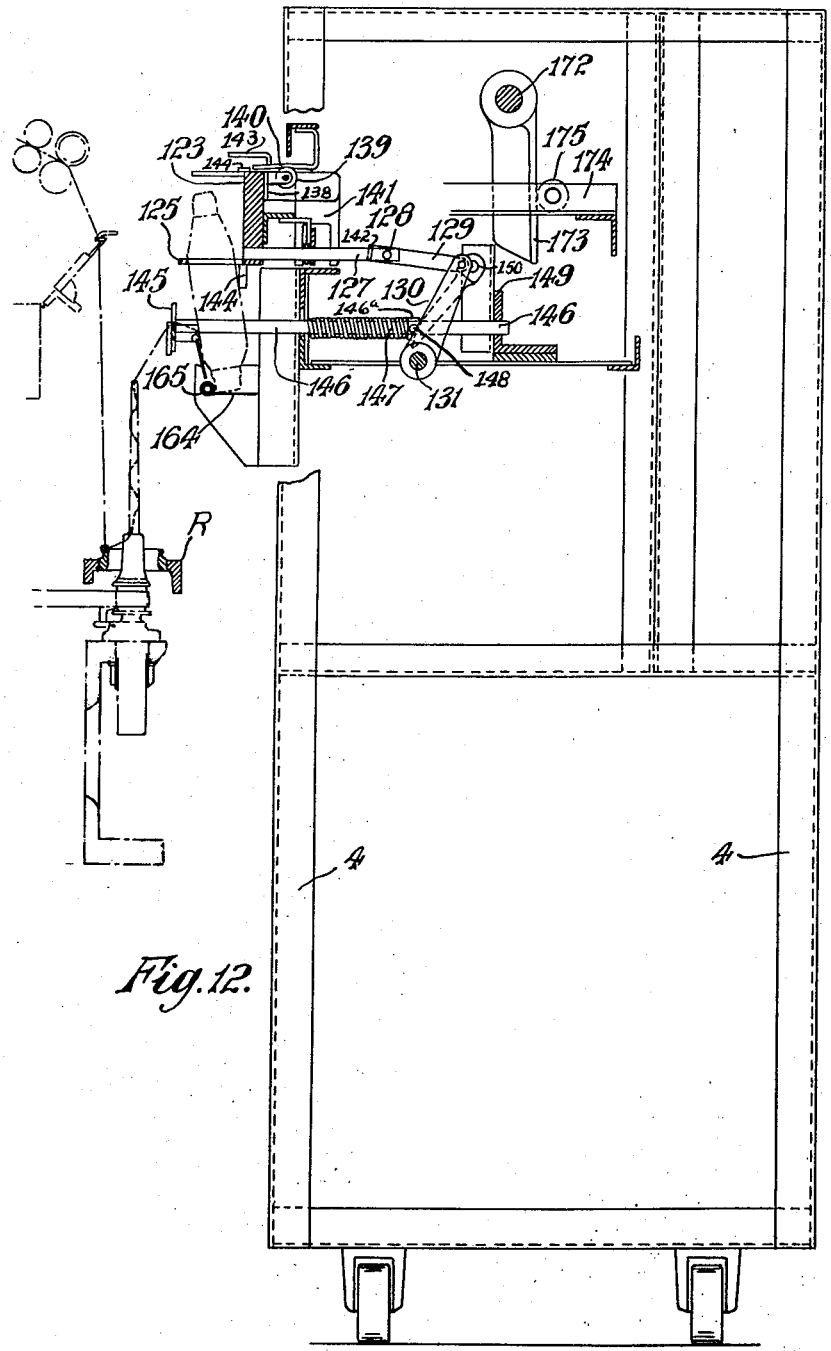
Fig. 12 is a similar view showing the cutting mechanism advanced, the bobbin lifting parts retracted, the bobbin supporting pins withdrawn and the bobbins dropped on to their temporary supports, with the threads in the cutters.

As the platform completes its upward movement the shaft 172 is rotated to draw the slide back until the bobbins be over the plate 164, the cutting mechanism during this time moving towards the outer position. As the slide 123 reaches the innermost position the pins 127 are withdrawn as above described, the bobbins then falling behind the cutters onto the plate 164 and pulling the yarn into the notches 145a of the bar 145. The plate 164 is sufficiently lower than the cutting mechanism to ensure the yarn being pulled between the open cutters. The parts are now as shown in Fig. 12.

Immediately thereafter, cam 154 comes into operation to complete the forward movement of the cutters, to effect the cutting operation and to release the plate 164, the parts now having returned to the position shown in Fig. 8.

As the rising and falling platform is going down, the sliding frame of the donning mechanism is moving outwardly, eventually releasing the bobbins from their compartments and, as the platform is lifted again, that frame moves inwardly, the hinged sections 81a fall back to receive fresh bobbins from the magazine. Towards the end of the outward movement of that sliding frame, the bobbin release mechanism below the magazine has been displaced to the one side, to allow the lowermost bobbin in each compartment of the magazine to fall on to the sliding slotted plate, and towards the end of the inward movement of that frame the bobbin release mechanism is returned to the other side, to allow those bobbins to fall on to the inclined sections 81a of the frame compartments, and also to interrupt the next lowest bobbins in the magazine compartments.

I declare that what I claim is:

1. Means for donning empty bobbins on to ring frame spindles comprising a magazine, which may be removable, divided into vertical compartments, each to hold a supply of horizontally-disposed bobbins, a pair of slotted sliding plates below the magazine movable relatively to each other as well as together so as to receive and discharge bobbins one by one from the magazine compartments, a horizontally slidable member having vertical compartments, one for each bobbin to be doffed, a hinged rear wall on said compartments, and means for lowering the wall to an inclined position when below the magazine, and raising it and the bobbins thereon to a vertical position as it moves out over the spindles to be doffed, said compartments having timed mechanism, supporting the bobbins in the compartments until they are directly over the spindles.

2. Means according to claim 1 having obstruction means for delaying the fall of the discharged bobbins at what is to be the upper end, to ensure that the bobbins are the correct way up when donned on to the spindles.

3. Means according to claim 1, wherein the compartments on the horizontally-slidable member have a front wall composed of hinged strips, one for each spindle to be donned, with yieldable means for moving them about their pivots, and wherein the retraction of the mechanism causes them to move about their pivots to press on the upper ends of the bobbins just placed on the spindles, the hinged plates then returning to the vertical position.

4. A machine for doffing ring frames including a frame, bobbin lifting mechanism for doffing a group of adjacent spindles simultaneously and bobbin feeding mechanism for donning an adjacent group of spindles simultaneously, a driving motor on the frame, and traverse mechanism for the frame, clutch means between the motor and the traverse mechanism with latching means for holding the clutch in the closed position, and separate clutch means between the motor and the doffing and donning mechanisms, with latching means for holding the said separate clutch means in the open position, a control member attachable to the ring frame and having at each operative position of the machine a means for tripping the latch of the first-named clutch means to de-clutch the drive to the traverse mechanism, and having separate means for de-clutching the drive to the doffing and donning mechanisms before and during the traverse of the machine from one operative position to the next, with means driven by the doffing and donning mechanisms to unlatch the clutch means in the drive to the traverse mechanism when the doffing and donning operation is complete.

5. A machine for doffing ring frame spindles having cutting means for severing the yarn leading from the doffed bobbins to the spindles they have left, which comprises a pair of relatively movable cutters for each spindle doffed simultaneously, spring means tending to close the cutters, and latching means holding them in open position until released to effect the cutting operation, and the machine having a supporting member for the released full bobbins, and means whereby said supporting member is removed immediately after the cutting operation.

6. A machine for doffing ring frame spindles having cutting means for severing the yarn leading from the doffed bobbins to the spindles they have left, which comprises a pair of relatively movable cutters for each spindle doffed simultaneously, spring means tending to close the cutters, and latching means holding them in open position until released to effect the cutting operation, and the machine having a supporting member for the released full bobbins, said supporting member being in the form of a hinged plate mounted on the machine frame with means for raising it to and latching it in a horizontal position when the cutting mechanism is in open position, and means for unlatching said supporting member to allow it to fall to a substantially vertical position immediately after the cutting operation.

HAROLD PARTINGTON.

References Cited in the file of this patent

UNITED STATES PATENTS

| Number | Name | Date |
|---|---|---|
| 691,677 | Tichon et al. | Jan. 21, 1902 |
| 745,466 | Tichon et al. | Dec. 1, 1903 |
| 1,062,439 | Colman | May 20, 1913 |
| 1,142,011 | Boozer | June 8, 1915 |
| 1,142,748 | Boozer | June 8, 1915 |
| 1,572,103 | Buchanan | Feb. 9, 1926 |
| 1,669,769 | Miller | May 15, 1928 |
| 2,449,742 | Foster et al. | Sept. 21, 1948 |